United States Patent
Yang (10) Patent No.: US 10,048,724 B1
(45) Date of Patent: Aug. 14, 2018

(54) DISCRETE TYPE WEARABLE COMPUTER

(71) Applicant: Tsai-Hsien Yang, Taoyuan (TW)

(72) Inventor: Tsai-Hsien Yang, Taoyuan (TW)

(\*) Notice: Subject to any disclaimer, the term of this patent is extended or adjusted under 35 U.S.C. 154(b) by 0 days.

(21) Appl. No.: 15/676,001

(22) Filed: Aug. 14, 2017

(51) Int. Cl.
G06F 1/16 (2006.01)
G06F 3/01 (2006.01)
G02B 27/01 (2006.01)

(52) U.S. Cl.
CPC .......... *G06F 1/163* (2013.01); *G02B 27/017* (2013.01); *G06F 1/1637* (2013.01); *G06F 3/014* (2013.01); *G02B 2027/0178* (2013.01)

(58) Field of Classification Search
CPC .............................. G06F 1/163; G06F 1/1637
See application file for complete search history.

(56) References Cited

U.S. PATENT DOCUMENTS

| | | | |
|---|---|---|---|
| 5,285,398 A | 2/1994 | Janik | |
| 5,305,244 A | 4/1994 | Newman et al. | |
| 5,774,338 A * | 6/1998 | Wessling, III | A41D 13/0012 2/94 |
| 6,507,486 B2 * | 1/2003 | Peterson, III | G06F 1/163 361/679.03 |
| 6,798,391 B2 * | 9/2004 | Peterson, III | G06F 1/163 345/8 |
| 7,502,643 B2 * | 3/2009 | Farringdon | A61B 5/0428 600/509 |
| 2016/0282935 A1 | 9/2016 | Yang | |
| 2017/0024007 A1 * | 1/2017 | Pelis | G06F 3/014 |

\* cited by examiner

*Primary Examiner* — Adrian S Wilson
(74) *Attorney, Agent, or Firm* — Muncy, Geissler, Olds & Lowe, P.C.

(57) ABSTRACT

The present invention relates to a discrete type wearable computer. The discrete type wearable computer includes a clothing accessory having a first installation element, a second installation element and a third installation element; a main board module set on the clothing accessory by the first installation element; a near-eye display module electrically connected with the main board module; an air mouse module electrically connected with the main board module and set on the clothing accessory by the second installation element; and a battery module electrically connected with the main board module and set on the clothing accessory by the third installation element, wherein the main board module, the air mouse module, and the battery module are configured on the clothing accessory and separated from each other.

11 Claims, 10 Drawing Sheets

DISCRETE TYPE WEARABLE COMPUTER

FIELD

The present invention relates to a discrete type wearable computer. In particular, it relates to a discrete type wearable computer, which separates off the computer into four modules including the processing module, the input module, the output module and the battery module.

BACKGROUND

In general, a conventional computer is defined as including several major units: an input unit receiving data, a memory unit storing data, a main processing unit responsible for processing or computing data, an output unit showing a processing result for data, and a power supply unit providing required power to drive the computer operating, wherein usually a volatile memory is used to temporally save data, and a nonvolatile memory is used to save massive data for a long-term period.

Nowadays, with the rapid developments in the field of the computer science, the total weight and size of a computer are getting lighter, thinner and smaller, and there are more and more new types of computers currently available on the market. Some of the most popular new types of computers are a portable type computer that a user can easily carry around since the weight and size thereof are light and small enough, and a split type computer that each module is separated off with each other and separately configured. For example, U.S. Pat. No. 5,305,244 and U.S. Pat. No. 5,285,398 disclose examples for the portable computer and the split type computer respectively.

As for the output unit, more research and development resources are applied to develop a revolutionary and high technology output unit product, such as, the Microsoft HoloLens product, the Epson Moverio BT-300 smart glass product, the 3D visual holographic technology and etc. Even the latest augmented reality and the virtual reality technologies are involved in the developments to try to create an astonished next generation visual output unit, which is capable of bringing a user much advanced, amazing and comfortable visual user experiences. For the input unit, the air mouse related technologies, the finger touch based input technology, and the gestures based input with the holographic technology, have been the focus for the research and development and the popular technologies applied to renovate the input unit product. US patent publication number US 2016/0282935 A1 discloses a well-designed air mouse as an example.

However, the split type computers available in the state of the art have multiple significant shortages and deficiencies as follows. The weigh distribution among the separated modules is non-uniform and uneven. For example, for the Microsoft HoloLens product or the Epson Moverio BT-300 smart glass product, the processing unit and the battery are not split off from but bundled and integrated with the output unit, which causes the products to get extra weight and relatively big size and maybe too big to wear on the head. Actually a head wearable product with extra large size might look so strangle and draw many unnecessary attentions. So when a user wears those products on the head for example, the user certainly feels wrier, heavy, clumsy and uncomfortable, due to the improper load distribution and the concentrated weight on the product, and its strangle funny appearance for sure.

Therefore, actually so far the spilt type computers are not so practical to use on a daily basis and thus hard to infiltrate into people's daily life, just like the smart phone. In addition, there is yet none of a split type computer or a better, more practical and advanced architecture for the split type computer available on the market, which is able to integrate, attempts to integrate, or combines above technologies or products together, to build up a more advanced, compatible and convenience computer system.

There is a need to solve the above deficiencies/issues.

SUMMARY

The present invention provides a discrete type wearable computer and proposes to divide the computer into multiple major modules, including the main board module for processing data, the air mouse module as the input device, the near-eye display module as the output device and the battery module and install each module on a decorative and fashionable scarf. The present discrete type wearable personal computer adopts and involves in the near-eye display which has a cool look of sunglass as the visual output component for a user, and the air mouse, which is a finger wearable input device and is small, light, and delicate as the input component. Such a deployment and a combination cause the present discrete type wearable personal becoming a practical and powerful wearable smart mobile device.

Furthermore, a dual replaceable rechargeable battery design is applied to the battery module in the present discrete type wearable computer, which is able to cause the present computer to continuously operate for a very long time without turning off. Therefore, the present discrete type wearable computer has a relatively small total size, a relatively light total weight, and is foldable, portable, and wearable. In particular, the present invention proposes to split off or separate off the battery from other modules as an independent battery module, to balance and adjust a weight distribution among modules and to obtain more uniform weight distribution. The present discrete type wearable computer is highly comparable to the future technologies.

Accordingly, the present invention relates to a discrete type wearable computer. The discrete type wearable computer includes a clothing accessory having a first installation element, a second installation element and a third installation element; a main board module set on the clothing accessory by the first installation element; a near-eye display module electrically connected with the main board module; an air mouse module electrically connected with the main board module and set on the clothing accessory by the second installation element; and a battery module electrically connected with the main board module and set on the clothing accessory by the third installation element, wherein the main board module, the air mouse module, and the battery module are configured on the clothing accessory and separated from each other.

Preferably, the clothing accessory is one selected from a scarf wear, a scarf, a silk scarf, a neckerchief, a neckpiece, a neckwear, a muffler, a tippet, a stole, a boa, a neck covering, a foulard and a shawl.

Preferably, the first installation element, the second installation element and the third installation element are one selected from a magnet, a clip, an alligator clip, a spring clip, a screw lock, a buckle, a button, belt, a band, a strip, a banding, an elastic strip, a fastener, a quick release element, a hook and loop element, a containing space, a pocket, a pouch, a storage bag, a compartment, and a partition.

Preferably, the main board module includes a CPU (central processing unit), a memory module, a wireless communication module, a GPS module, a USB interface, a HDMI interface, a microphone interface, a second cam module, a second microphone, a NFC interface, a temperature sensor, a uSIM slot, a uSD card slot, an ear phone socket, a signal line socket and a power line socket.

Preferably, the near-eye display module includes a near-eye display, a first cam module, an accelerometer, a gyroscope, an electronic compass, a barometer and a first microphone.

Preferably, the air mouse module includes an air mouse body, a gyroscope, a third microphone, a micro speaker and a USB OTG interface.

Preferably, the battery module includes a first battery and a second battery, the first battery is a fixed rechargeable battery, and the second battery is a replaceable rechargeable battery.

Preferably, the main board module is electrically connected with the near-eye display module, the air mouse module and the battery module through one of a wire based connection, a cable based connection and a wireless connection.

Preferably, the discrete type wearable computer further includes one of following elements: the clothing accessory having a first end, a center segment and a second end, wherein the first installation element is configured to locate around the center segment, the second installation element is configured to locate around the first end, and the third installation element is configured to locate around the second end; a first attaching element configured to locate around one of the first end and the second end; a second attaching element configured to locate around one of the first end and the second end; and a third attaching element configured to locate around one of the first end and the second end.

Preferably, the first attaching element, the second attaching element and the third attaching element are one selected from a magnet, a clip, an alligator clip, a spring clip, a button, belt, a band, a strip, a banding, an elastic strip, a fastener, a hook and loop element.

Preferably, the near-eye display module is a transparent type near-eye display device or a see-through type near-eye display device, and the air mouse module is a finger-wearable input device.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

The present disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

It is to be noticed that the term "comprising" or "including", used in the claims and specification, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B. The term "discrete type" used in the claims and specification is referred to as "split type" or "separated type" as well and equivalently.

Figure 1:
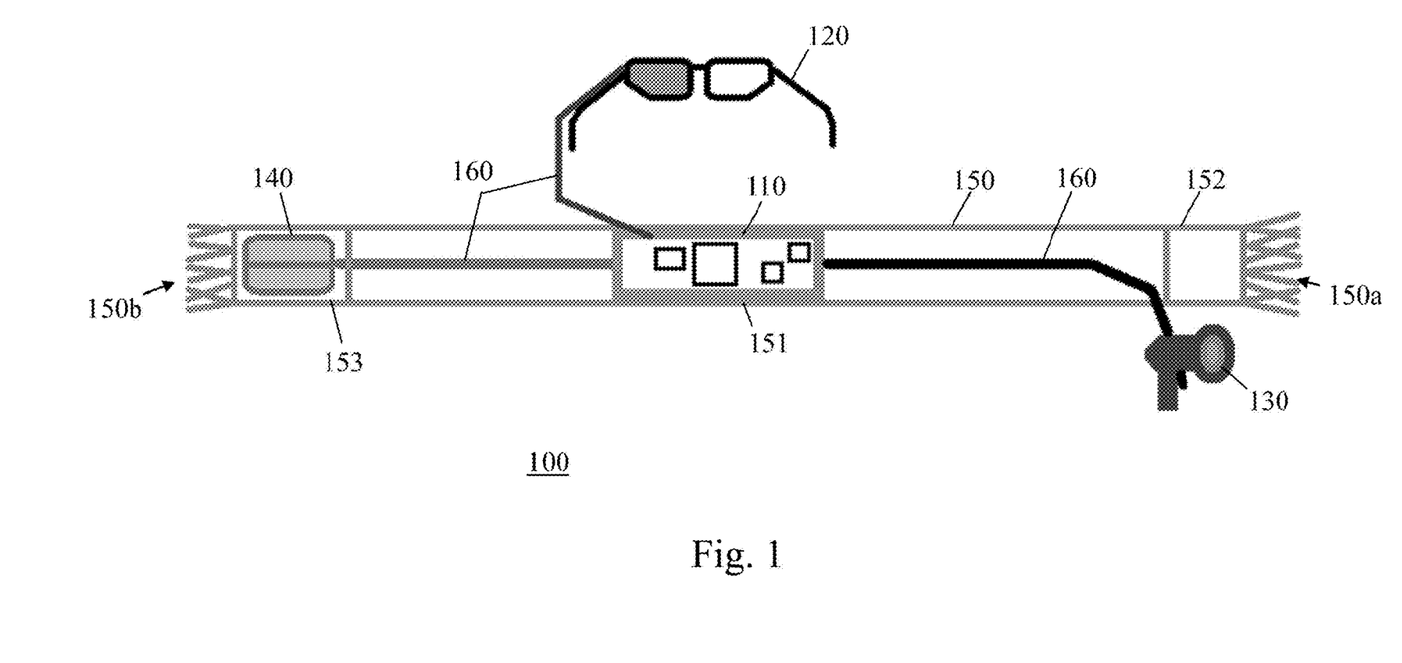
FIG. 1 is a schematic diagram illustrating a discrete type wearable computer in accordance with the present invention.

FIG. 1 is a schematic diagram illustrating a discrete type wearable computer in accordance with the present invention. The discrete type wearable computer 100 in FIG. 1 includes multiple modules as follows: the main board module 110, the near-eye display module 120, the air mouse module 130, the battery module 140 and the clothing accessory. Each modules included in the discrete type wearable computer 100 are separately and discretely disposed, separated from each other, and electrically connected with each other. The main board module 110, the near-eye display module 120, the air mouse module 130 and the battery module 140 are separately and discretely disposed on the clothing accessory. The clothing accessory is preferably one selected from a scarf wear, a scarf, a silk scarf, a neckerchief, a neckpiece, a neckwear, a muffler, a tippet, a neck covering, a shoulder covering, a foulard, a shawl, a scarf based article, a neck-piece based article, and a shawl based article. In this embodiment, the clothing accessory is a scarf 150.

The main board module 110 includes a CPU (central processing unit), a memory module, a wireless communication module, a GPS module, a USB interface, a HDMI interface, a microphone interface, a second cam module, a second microphone, a NFC interface, a temperature sensor, a uSIM slot, a uSD card slot, an ear phone socket, a signal line socket and a power line socket. The main board module 110 mainly acts as a processing unit responsible for receiving data for processing and computing.

The near-eye display module 120 includes a near-eye display, a first cam module, an accelerometer, a gyroscope, an electronic compass, a barometer and a first microphone. The near-eye display module 120 is electrically connected with the main board module 110 through one of a transmission wire 160 or a wireless connection. The transmission wire is preferably a charge and sync cable. The near-eye display module 120 mainly acts as an output unit for users and is designed to have the cool look of a sunglass. The near-eye display on the module 120 has the flipable or the flip-up mechanical structure, as disclosed in US patent application number U.S. Pat. No. 9,678,349 B2 which has the Applicant the same as the present invention does and is incorporated into this application by reference as if fully set forth herein, and is disposed on the near-eye display module 120 through the flipable mechanical structure. So a user can easily flip up the near-eye display on the module 120 to have a clear and unscreened field of eyesight.

The air mouse module 130 includes an air mouse body, a gyroscope, a third microphone, a micro speaker and a USB OTG interface. The air mouse module 130 is electrically connected with the main board module 110 through transmission wire 160 or a wireless connection. The air mouse module 130 mainly acts as an input unit for users. In the present embodiment, the finger-wearable input device as disclosed in US patent publication number US 2016/0282935 A1 which has the Applicant the same as the present invention does and is incorporated into this application by reference as if fully set forth herein, acts as the air mouse module 130. The battery module 140 includes at least a couple of batteries and provides required electric power to the main board module 110 through transmission wire 160 or a wireless connection. The first battery is a fixed rechargeable battery, and the second battery is a replaceable and rechargeable battery. The battery module 140 mainly acts as a power supply unit.

The present invention proposes to divide the conventional personal computer into above four modules, units or parts, including the main board module 110, the near-eye display module 120, the air mouse module 130 and the battery module 140 to form the discrete type wearable computer 100. In the state of the art, usually the battery accounts for a high proportion of the total weight of the computer, that is a battery or battery module generally remains bearing a high proportion to the overall weight of computer. It appears a basic architecture or design for the current discrete or separated computer to spin or separated off the battery as a discrete, a separated battery or an independent battery module is so far yet unavailable over the market. As described in the section background, the current technology in the art is still used to integrate the battery into other unit, such as, the input unit, the output unit, or the main board unit etc., that is still to combine the battery with the input unit, the output unit, or the main board unit. However, such an architecture or a design can only cause the module equipped with the battery module particularly heavy and a weight distribution among modules uneven or non-uniform, which brings a user particularly feeling heavy and clumsy for a specific module or even for the whole computer, and probably causes inconveniences or additional burdens for a user in use or operation.

Thus in particular, the present invention proposes to spin off or separate off the battery module to act as an independent module or a separated unit from other modules. After the separation, each module in the present invention, including the main board module 110, the near-eye display module 120, the air mouse module 130 and the battery module 140, has relatively less weight, and gets lighter. None of above modules is particularly heavy or clumsy, and the weight distribution among above respective modules turns into more even and balance, which benefits a user to operate and use by wearing.

Each module in accordance with the present invention is arranged to separately and discretely dispose on a clothing accessory, for example a scarf 150. The scarf 150 in accordance with the present invention is especially and well designed to have at least three installation elements to render the main board module 110, the air mouse module 130 and the battery module 140 attached on the scarf 150. The installation elements are, such as, a magnet, a clip, an alligator clip, a spring clip, a screw lock, a buckle, a button, belt, a band, a strip, a banding, an elastic strip, a fastener, a quick release element, a hook and loop element, a containing space, a pocket, a pouch, a storage bag, a compartment, and a partition. In the present embodiment, there are three pockets, the first pocket 151, the second pocket 152 and the third pocket 153, are set on the scarf 150 to act as the installation elements.

Preferably, the first pocket 151 is arranged to locate at a spot around the center segment of the scarf 150, and the second pocket 152 and the third pocket 153 are preferably arranged to locate at different spots close to the first end 150a and the second end 150b of the scarf 150 respectively. The spots for setting the second and the third pockets 151, 152 and 153 on the scarf 150 are not limited as above, and can be any position on the scarf 150. In addition, there is an ultra back installation element, such as a forth pocket (not shown in FIG. 1), configured on the scarf 150 and is preferable to locate at a spot close to the center segment of the scarf 150 in this embodiment as well.

The main board module 110 is preferably configured, placed, contained or installed in the first pocket 151 close to the center segment of the scarf 150 and electrically connected with other three modules through multiple charge and sync cables. The main board module 110 is designed to have a heat dissipation structure to properly dissipate heat energy generated during working. The air mouse 130 and the battery module 140 are preferably configured, contained, placed or installed in the second pocket 152 and the third pocket 153 around the first end 150a and the second end 150b of scarf 150 respectively, and the near-eye display module 120 is preferably configured, contained, placed or installed in the fourth pocket (not shown in FIG. 1). In the present embodiment, the fourth pocket is arranged to preferably locate around the center segment of the scarf 150 in this embodiment.

Figure 2:
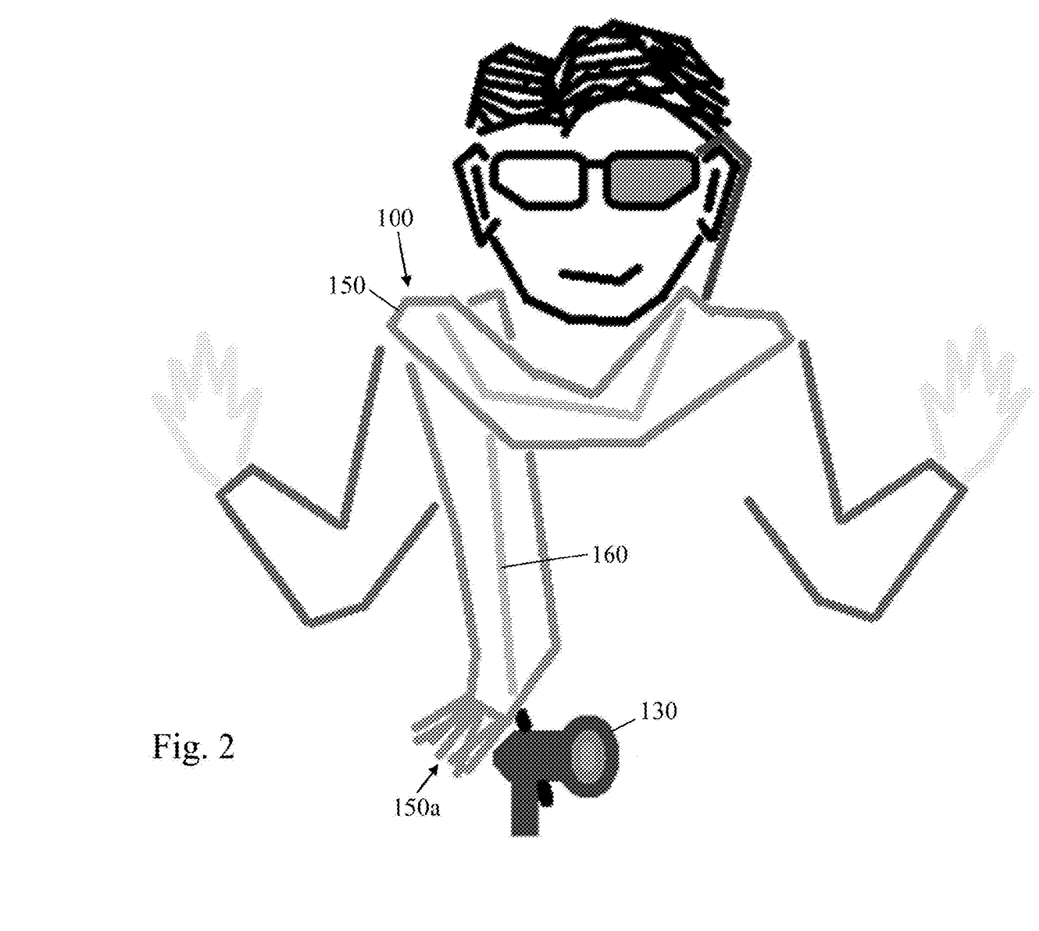
FIG. 2 is a schematic diagram illustrating a first wearing status for the discrete type wearable computer in accordance with the present invention.
Figure 3:
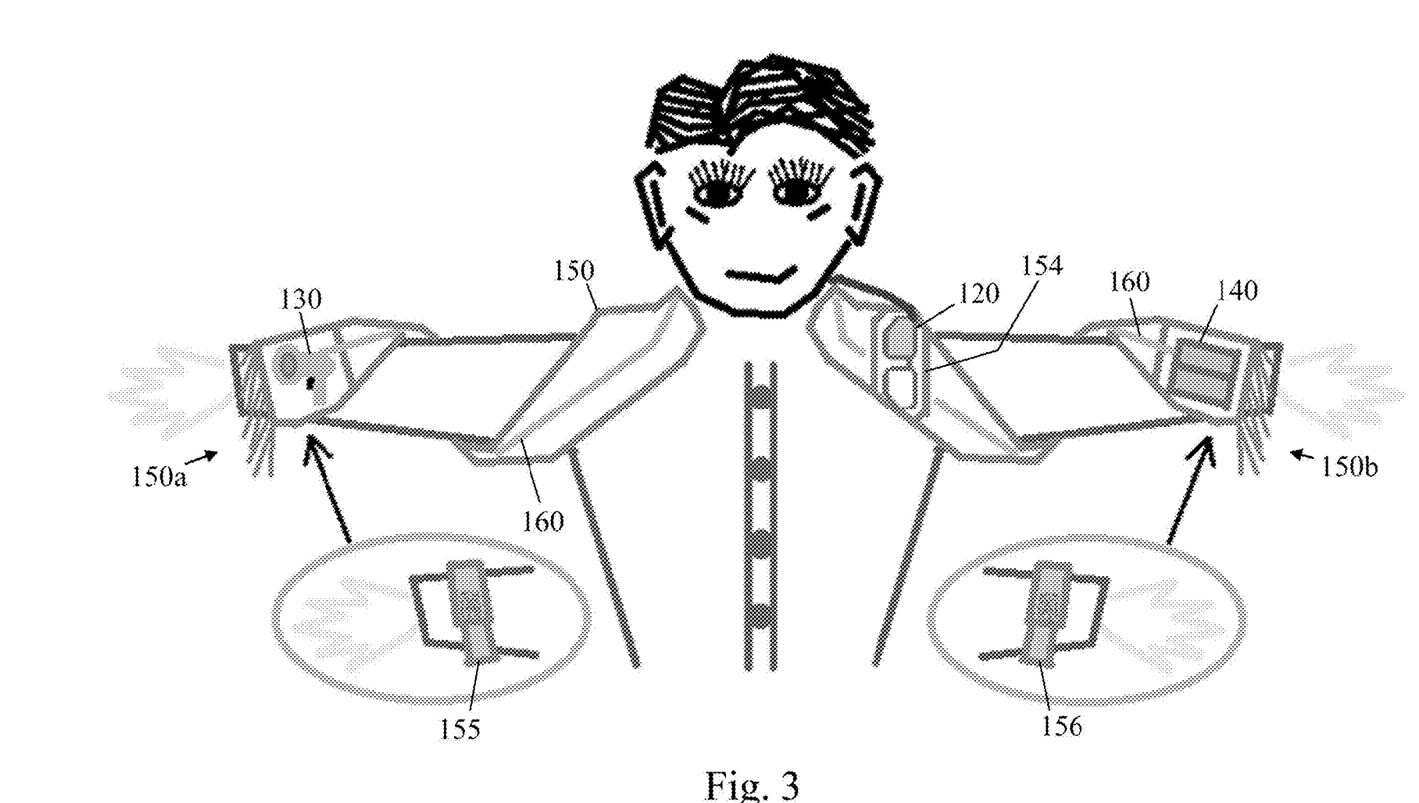
FIG. 3 is a schematic diagram illustrating a second wearing status for the discrete type wearable computer in accordance with the present invention.
Figure 4:
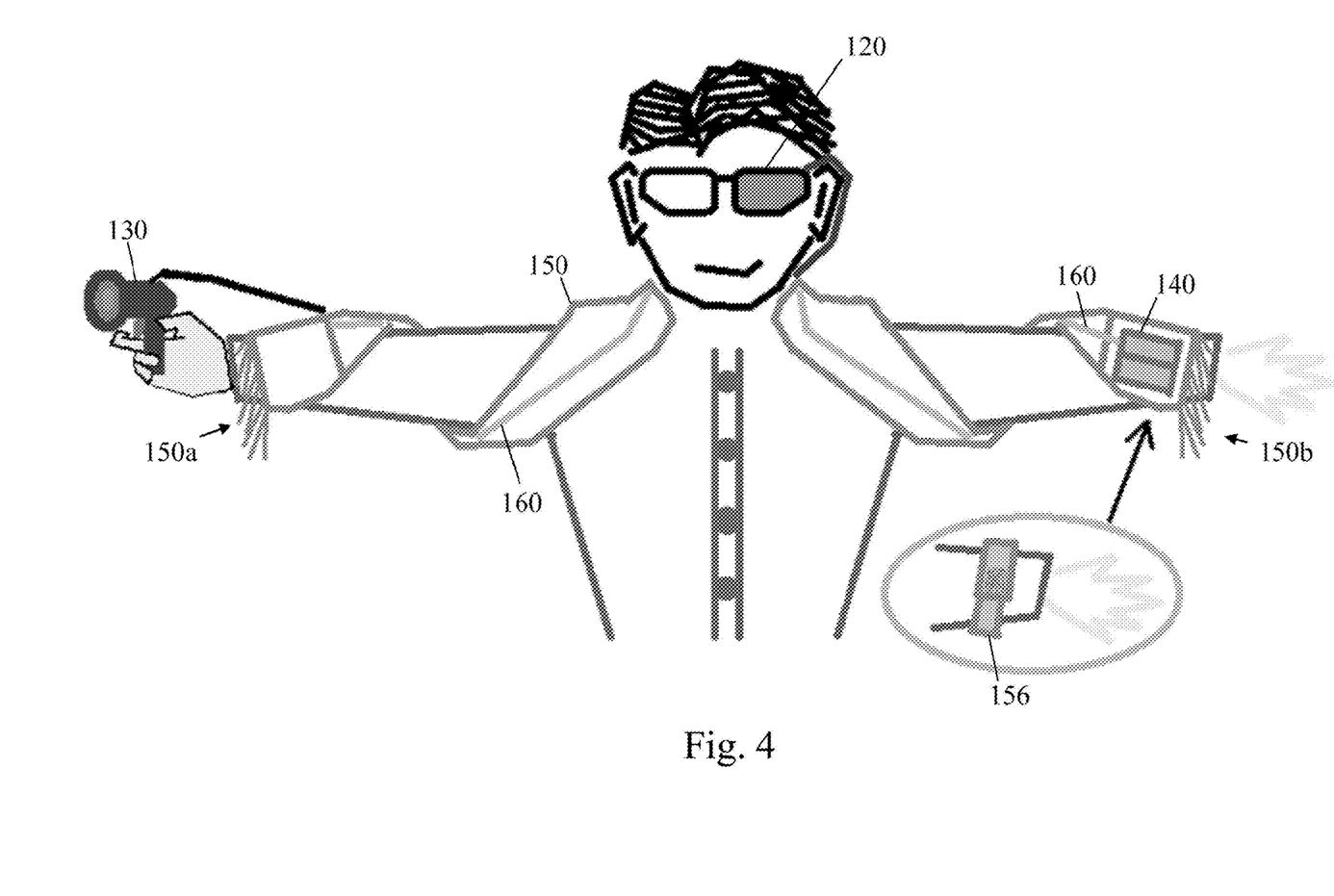
FIG. 4 is a schematic diagram illustrating a third wearing status for the discrete type wearable computer in accordance with the present invention.
Figure 5:
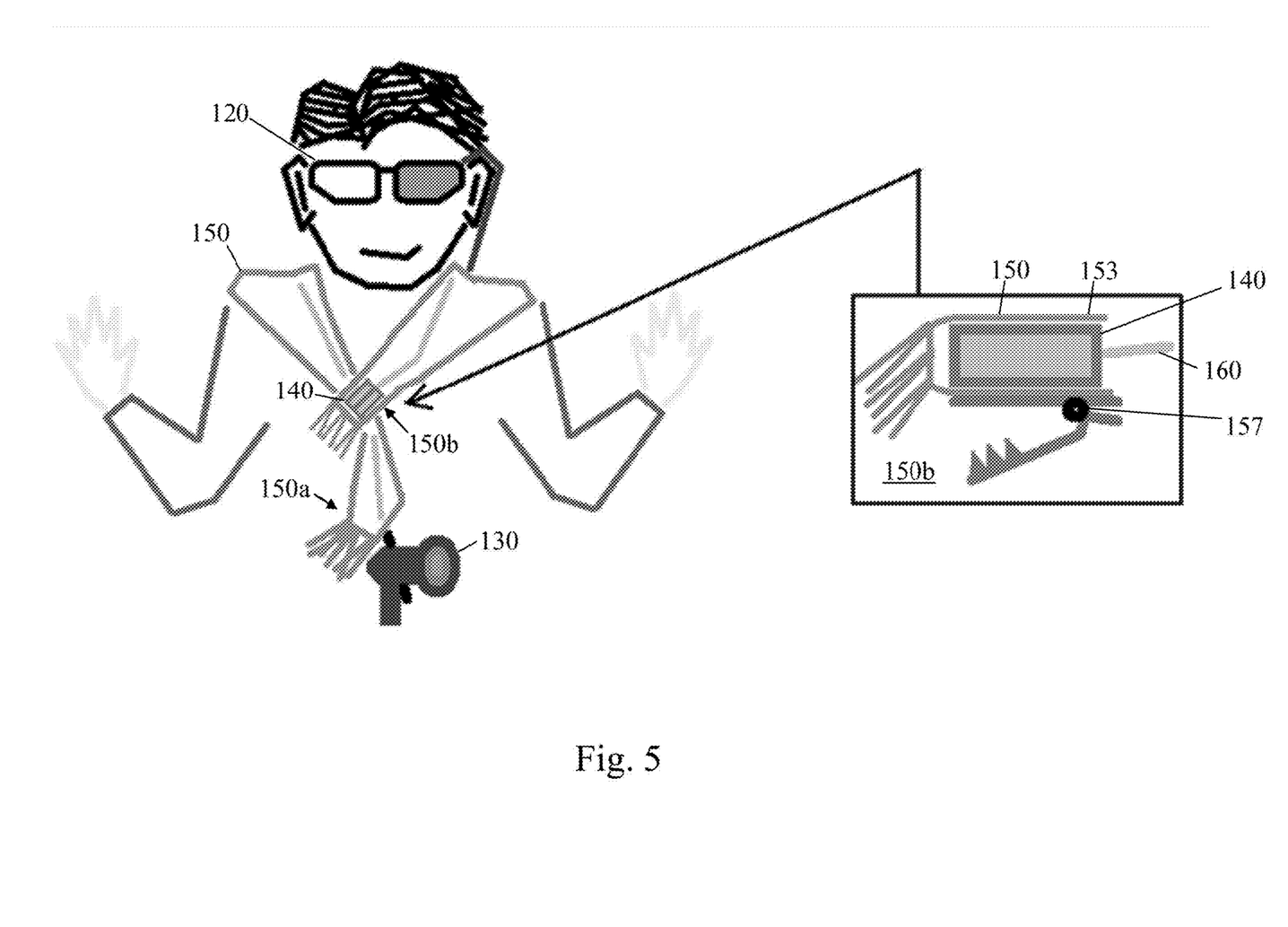
FIG. 5 is a schematic diagram illustrating a fourth wearing status for the discrete type wearable computer in accordance with the present invention.

FIG. 2 is a schematic diagram illustrating a first wearing status for the discrete type wearable computer in accordance with the present invention. FIG. 3 is a schematic diagram illustrating a second wearing status for the discrete type wearable computer in accordance with the present invention. FIG. 4 is a schematic diagram illustrating a third wearing status for the discrete type wearable computer in accordance with the present invention. FIG. 5 is a schematic diagram illustrating a fourth wearing status for the discrete type wearable computer in accordance with the present invention.

Each module on the discrete type wearable computer 100 is particularly designed and integrates into a scarf 150 in a cool fashion style and able to be easily wore on a user. When a user goes to use the computer 100, one has to wear on the computer 100 firstly. It is preferable to drape the segment on the scarf 150 where the first pocket 151 containing the main board module 110 is located around the rear neck and over shoulders of a user, and let the two ends 150a and 150b of the scarf 150 hanging down in front of the chest naturally. Then it is to take one end of the scarf 150, preferably the second end 150b having the third pockets 153 containing the battery module 140, to wrap the scarf 150 around the neck several times (preferably twice times) and leave the thread of the second end 150b ends in the back behind the body and the thread of the first end 150a having the second pocket 152 containing the air mouse module 130 in front of the chest. Next, a user takes out the near-eye display module 120 from the fourth pocket and puts it on in front of eyes. So far, a user finishes the wearing for the computer 100 and gets ready to explore the world with the computer 100.

Preferably the scarf 150 further includes a first attaching element 155 and a second attaching element 156, such as, a magnet, a clip, an alligator clip, a spring clip, a button, belt, a band, a strip, a banding, an elastic strip, a fastener, a hook and loop element, arranged to locate at the first end 150a and the second end 150b respectively. The first attaching element 155 and the second attaching element 156 are optional parts. In FIG. 2, there is none of attaching elements on the scarf 150. In FIG. 3, there are two attaching elements configured on the respective ends 150a and 150b of the scarf 150. The near-eye display module 120 is placed in the fourth pocket 154. In FIG. 4, there is only one attaching element configured on one of two ends 150a and 150b of the scarf 150. The first and second attaching elements 155 and 156 are mainly used for rendering the scarf 150 attach, mount, catch or secure onto the scarf 150, a user's cloth or body, an article or something else.

For example, when a user rides the subway or the trolley during commuting period and has to stay in a very crowded cabin or space, the user can simply attach or secure the two ends 150a and 150b of the scarf 150 on the hand wrists through the first or second attaching elements 155 or 156, to avoid the computer 100 on the scarf 150 broken by the crowd, or the scarf 150 falling to the floor. Alternatively, a user is also able to simply take off the computer 100 with the scarf 150 easily, then fold it and put the folded scarf 150 into a carried briefcase or a purse.

In addition to the first and second attaching elements 155 and 156, the scarf 150 preferably further includes a third attaching element 157, such as, a magnet, a clip, an alligator clip, a spring clip, a button, belt, a band, a strip, a banding, an elastic strip, a fastener, a hook and loop element, arranged to locate at one of the first end 150a and the second end 150b on the scarf 150. The third attaching element 157 is mainly used for attaching, mounting, or securing the scarf 150 onto the scarf 150, a user's cloth or body, an article or something else. In particular, in the most time, the third attaching element 156 is mainly used for securing one end of the scarf 150, for example, the first end 150a, onto the scarf 150. By configuring the third attaching element 157, a user is able to wear the scarf 150 on the neck quickly and easily, just by simply warping or looping the scarf 150 around the neck once and then using the third attaching element 157 to make the first end 150a attach, clip or secure onto the scarf 150. As shown in FIG. 5, the third attaching element 157 is used to make the second end 150b of the scarf 150 clip or secure onto the tail segment near the first end 150a or the center segment of the scarf 150, to form a loop around the user's neck and make the scarf 150 wear onto a user quickly and simply. In this embodiment, the third attaching element 157 is configured close to the third pocket 153 containing the battery module 140 on the second end 150b.

Figure 6:
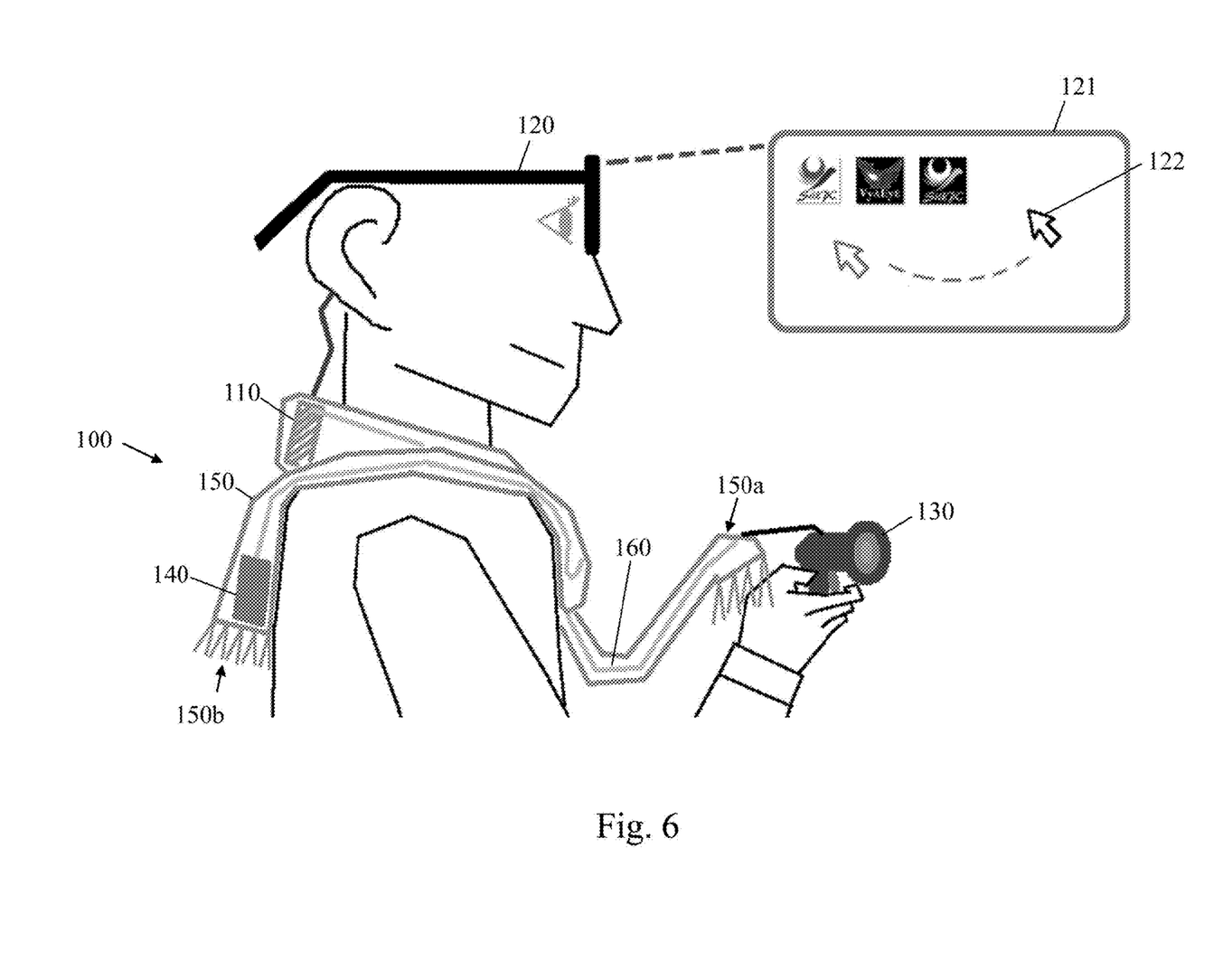
FIG. 6 is a schematic diagram illustrating an operation scenario for the discrete type wearable computer in accordance with the present invention.

FIG. 6 is a schematic diagram illustrating an operation scenario for the discrete type wearable computer in accordance with the present invention. When operating the computer 100, a user takes out or does not take out the air mouse module 130 from the second pocket 152 on the first end 150a to operate the indication cursor 122 on the near-eye display 121 included in the near-eye display module 120. The air mouse module 130 is preferably a finger-wearable input device which includes all the technical features as disclosed in US patent publication number US 2016/0282935 A1, which has the Applicant the same as the present invention does and is incorporated into this application by reference as if fully set forth herein. The air mouse body in the air mouse module 130 is the operative bulk in US patent publication number US 2016/0282935 A1 to be worn on a finger of a user. When a user takes out the air mouse module 130 from the second pocket 152, one can wear the air mouse body on a finger of a user.

Please to be noticed, when the computer 100 has been operated for a relatively long period, a low battery indicator is shown on the near-eye display 121. At the time, a user can simply remove the second battery in the battery module 140 which is a replaceable and rechargeable battery from the battery module 140 and replace the other second battery that is fully-charged back to the battery module 140. Since the first battery in the battery module 140 is not removed, still has a electric power and is capable of keeping providing the electric power to the computer 100, the computer 100 can keep operating and running without turning off due to the battery replacement. Further in cooperation with the heat dissipation structure on the main board module 110, the computer 100 is able to achieve the technical effect to cause the discrete type wearable computer 100 to continuously run and operate for even an infinite long period of time, without shutting down or turning off.

In addition, in the present invention the clumsy battery or battery module is removed or split off from the head-worn or head-mounted unit which refers to the module or device worn on a user's head part. In the present invention, the only module has to wear on the head part is the near-eye display module 120. That is no matter the dimension or weight for the head-worn or head-mounted module in the present invention is significantly reduced and simplified, and there is the near-eye display module 120 left on the head part only.

The near-eye display module 120 is designed to have relatively light weight and a cool appearance of sunglass, which is fashionable and comfortable for a user to put on for even all day long without feeling weird, heavy or tired. Furthermore, the near-eye display 121 on the module 120 has the flip-up mechanical structure, and a user can easily move the near-eye display 121 into the field of eyesight by flipping down the display 121 when needed, and flip up the near-eye display on the module 120 to move it out of the field of eyesight to obtain a clear and unscreened vision when unneeded.

For the overall spatial configuration of all modules in the present invention, the main board module 110 is arranged to situate around the rear neck of a user, where is about to be the center of the computer 100. Therefore, the distances from the main board module 110 to the respective modules 120, 130 and 140 are approximately the same and relatively short. It means if the main board module 110 electrically connects with each module 120, 130 and 140 in a cable based scheme, the connecting cables from the main board module 110 to the respective modules 120, 130 and 140 are relatively short as well and hence the signal transmitted in the short cable has less chances or probabilities to be interfered by external noises.

For example, the near-eye display module 120 goes to have a relatively short distance to the main board module 110 (contained in the first pocket 151 draping over the rear neck), as if compared with the conventional smart glass, for example, Epson Moverio BT-300 smart glass, and therefore transmission wire 160 electrically connecting the near-eye display module 120 and the main board module 110 is relatively short, so that a video signal transmitted to the near-eye display in the short cable has less chances or probabilities to be interfered by external noises and can have better video quality and signal stability.

For instance, a distance between a pair of ear phones to the main board module 110 or the ear phone socket on the module 110 is relatively short as well, since the main board module 110 is situated around the rear neck which is typically considered in proximity to the user's ears. In addition to avoid possible external noises in the cable, a short ear phone cable can avoid possible and commonly-seen tangled wires as well, as if compared with the conventional smart glass, for example, Epson Moverio BT-300 smart glass.

Each module 110, 120, 130 and 140 on the computer 100 is well arranged to discretely and separately configure on the scarf 150, and therefore any user is able to easily wear on the computer simply by intuition. In general, a scarf is basically a decorative clothing accessory, and a scarf 150 in good look can make a user look more attractive, fashion and modern. Therefore, the present invention proposes to separate the computer 100 off to discretely set up on a scarf 150, to artfully collect, configure and hide the respective modules 110, 120, 130 and 140 and the computer 100 on the scarf 150, so in addition to the various practical functions, the scarf based discrete type wearable computer 100 in the present invention further provides a user very good decoration effect. When a discrete type wearable computer 100 configured on a well designed and good look scarf 150, a user who wears it turns into have allured, fashionable and attractive image, but is never freaky or nerdy.

The air mouse module 130 contained in the second pocket 152 around the first end 150a of the scarf 150 is equipped with transmission wire 160 to electrically connect with the main board module 110, which the cable has a length that fits a length of a user's arm. Therefore, a user can control the cursor 122 comfortably and precisely by using the air mouse module 130. When the air mouse module 130 is not in use, it can be put back to the second pocket 152 at the first end 150a. Then take the thread around the first end 150a to wrap around the neck couple times and just leave the first end 150a hanging naturally behind the body. The numbers of loops for wrapping the first end 150a around the neck depends on the hanging or remaining length of the thread intended to leave behind. When the air mouse module 130 is placed in the second pocket 152 and the two ends 150a and 150b of scarf 150 are left in the back, a user's two hands are set to free, which significantly increases the user's activity capability.

In addition to the above multiple advantages, the main board module 110 is arranged to locate around the rear neck which provides a higher unsheltered and better position for antennas of the GPS module, the wireless communication module, as if compared with the belt based personal computers disclosed in U.S. Pat. No. 5,305,244 and U.S. Pat. No. 5,285,398. There is a second cam module disposed on the main board module 110 and a lens on the second cam module mainly faces toward the back behind a user to catch a rearview image out there behind a user and send it to the near-eye display.

There are an accelerometer, a gyroscope, an electronic compass and a barometer disposed on the near-eye display module 120, which is capable of detecting a current position, direction, rotation or movement of the head for a user and has a magnetic north direction tracking or search capability, as disclosed in U.S. Pat. No. 9,678,349 B2, which has the Applicant the same as the present invention does and is incorporated into this application by reference as if fully set forth herein. With the cooperation of an accelerometer, a gyroscope, an electronic compass and a barometer on the near-eye display module 120, the near-eye display module 120 can still perform an indoor navigation, even though a user is currently inside a building or an underground metro station or under a bridge where the GPS signal is relatively weak.

There are totally three sets of microphones disposed on the discrete type wearable computer 100. The first microphone is disposed on the near-eye display module 120, the second microphone is disposed on the main board module 110, the third microphone is disposed on the air mouse module 130, and each microphone is able to receive and collect sounds around a user from various acoustic fields or directions. For example, the first microphone collects a sound from a front acoustic field in front of a user, the second microphone collects a sound from a rear acoustic field in the back of a user and the third microphone collects a sound from a side acoustic field or a side acoustic field around a palm of a hand of a user. Thus, it is easy for the computer 100 to perform various advanced digital acoustic processing, such as, a noise cancellation, a noise suppression, an echo cancellation or a beam forming, based on the sound samplings collected from different directions, to enhance the sound quality generated from the computer 100.

Figure 7:
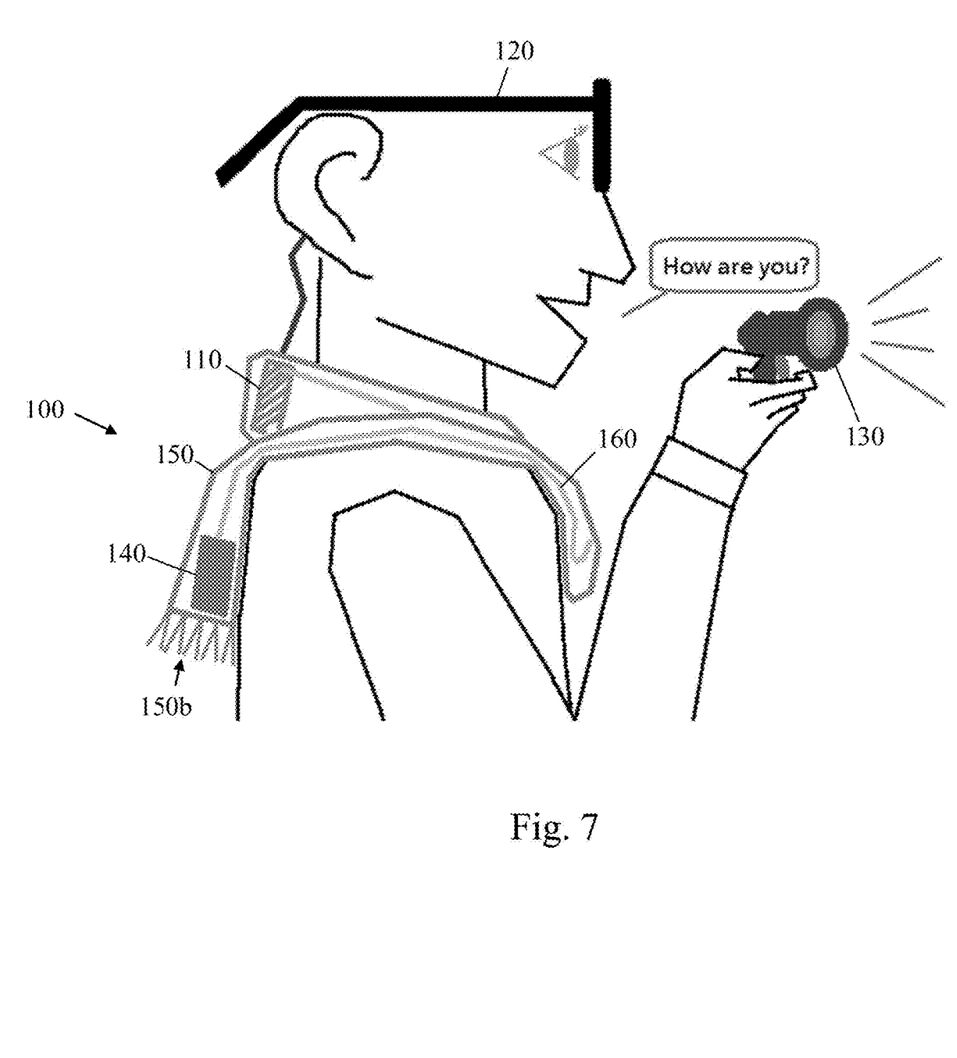
FIG. 7 is a schematic diagram illustrating an operation scenario that a user is using the instant translation function through the air mouse module in accordance with the present invention.

FIG. 7 is a schematic diagram illustrating an operation scenario that a user is using the instant translation function through the air mouse module in accordance with the present invention. There are a third microphone and a micro speaker disposed on the air mouse module 130. The air mouse module 130 is worn on a finger of a user. Any user can straightforwardly speak to the third microphone in a first selected language, and the instant smart translation engine including the voice recognition library and the translation library (an application program installed on the main board module 110) performs an instant bilingual translation, for example, to translate the first selected language into the second selected language when the first selected language is detected or recognized, and then pronounce voices in the second selected language for the first selected language through the micro speaker instantly, and vice versa.

That is, when a user who speaks in the first language and is not familiar with a second selected language requires talking with a foreign people who speaks in the second selected language and is not familiar with the first selected language, with the assistance of the instant translation engine provided by the discrete type wearable computer 100, the user is able to freely communicate with or talk to any foreign people. It looks like the user suddenly owns a super power capability for multiple languages in oral speaking or interpreting. The instant translation function is mainly realized through the third microphone and the micro speaker on the air mouse module 130 worn on a finger of the user which benefits the user to use, since all the user needs is just to gently move the finger with the air mouse module 130 close to the mouth.

Figure 8:
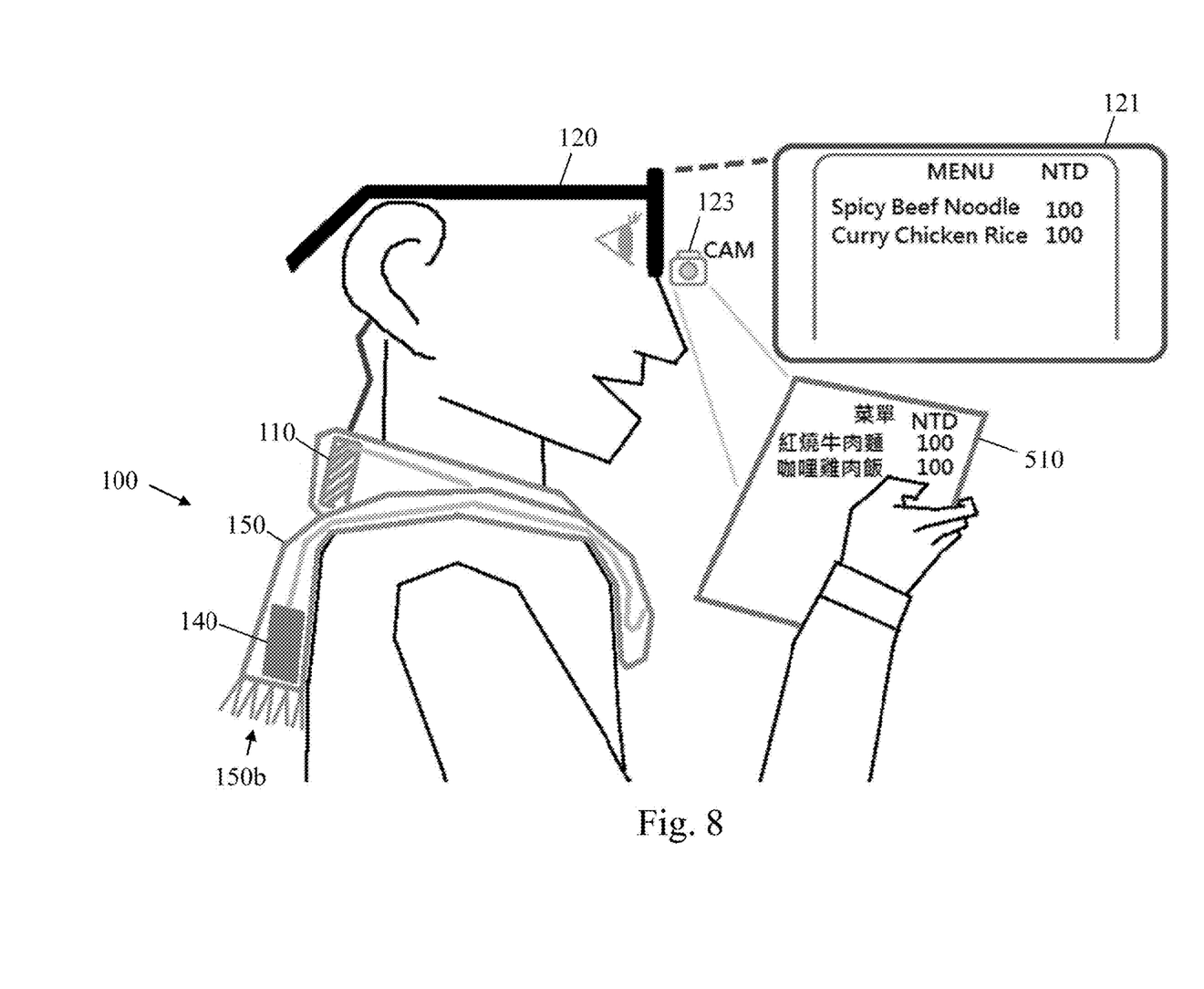
FIG. 8 is a schematic diagram illustrating an operation scenario that a user is using the optical character recognition function through the near-eye display module in accordance with the present invention.

FIG. 8 is a schematic diagram illustrating an operation scenario that a user is using the optical character recognition function through the near-eye display module in accordance with the present invention. In addition to the instant translation engine, there are an optical character recognition (OCR) software, a time lapse software, a smart navigation software and an artificial intelligence robot installed on the main board module 110. For example, a user can use the first cam module 123 on the near-eye display module 120 to catch foreign characters, Chinese characters for example, on a menu 510, for example, and the computer 100 recognizes the Chinese characters, translates them into corresponding English characters, and shows the English characters on the near-eye display 121. Therefore, a user can utilize the first cam 123 together with the OCR function in the computer 100 to recognize and understand different characters all around the world easily. Moreover, a user can utilize the first cam 123 together with the time lapse software in the computer 100 to record and film a hyper lapse or frame lapse photography, vlog or video anytime anywhere.

Figure 9:
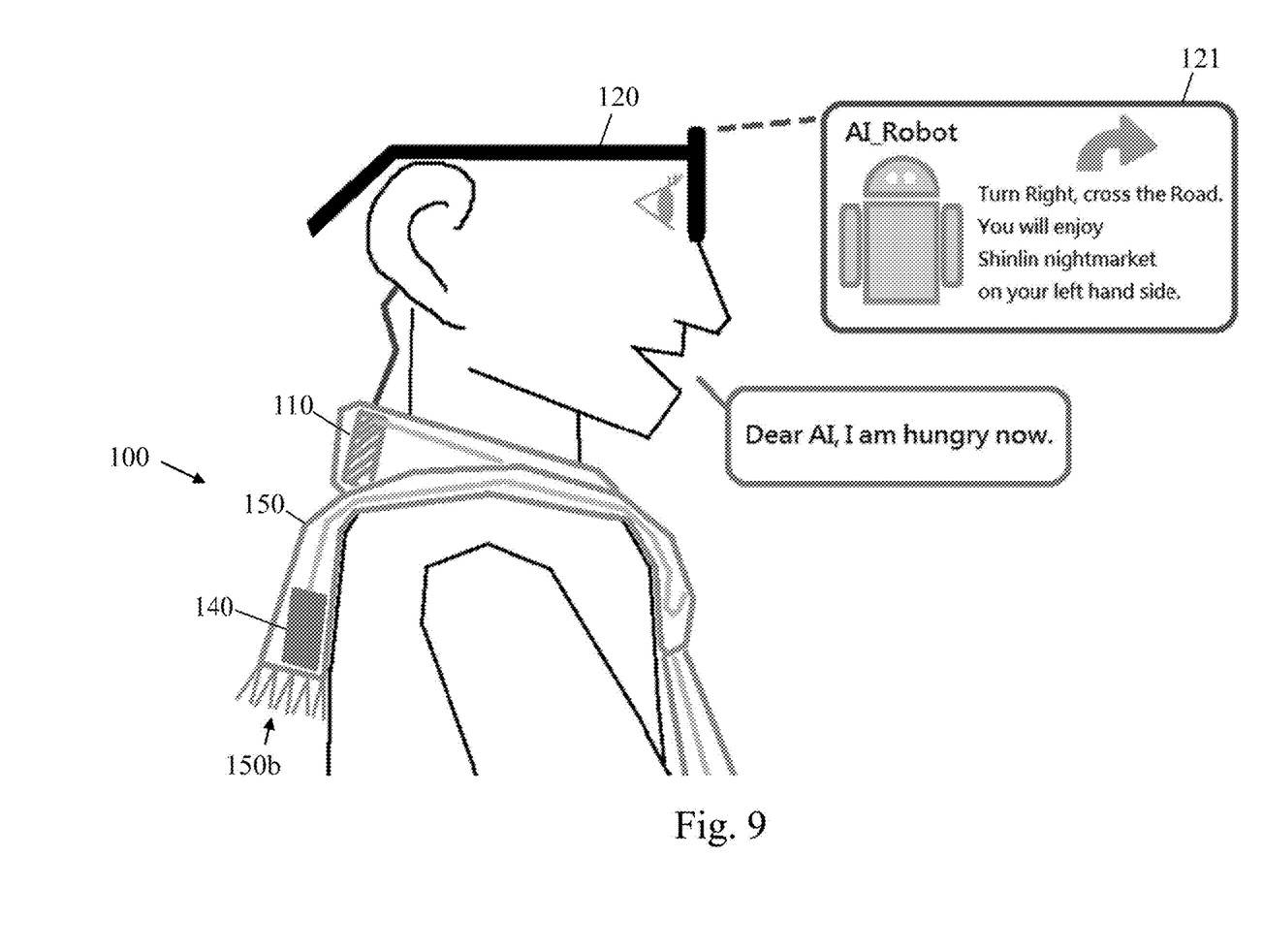
FIG. 9 is a schematic diagram illustrating an operation scenario that a user is using the artificial intelligence robot through the near-eye display module in accordance with the present invention.

FIG. 9 is a schematic diagram illustrating an operation scenario that a user is using the artificial intelligence robot through the near-eye display module in accordance with the present invention. A sophisticated artificial intelligence (AI) robot can reside and stay in the operation system on the discrete type wearable computer 100 as a resident program, and a user can benefits by the resident AI application. For example, a user can speak to the first microphone on the near-eye display module 120 or to the third microphone on the air mouse module 130 and says: "Dear AI, I am hungry now.". The resident AI robot in the operation system responds instantly to the user by showing the contents: "Turn Right, cross the Road. You will enjoy Shinlin night market on your left hand side." on the near-eye display 121. The resident AI robot goes to show the corresponding map on the near-eye display 121 simultaneously, if necessary. The response from the AI robot is smart and funny.

For a second example, the resident AI robot has the voice recognition function and a user can say a series of keywords to command and control the AI robot or the discrete type wearable computer 100. A user can also talk and chat with AI robot anytime anywhere just like chatting with an old friend. The AI robot is well trained or fine tuned and can respond to and talk with a user quickly, smartly and appropriately.

For third example, the resident AI robot in the operation system can continuously connect to a cloud database through the wireless communication module and the first cam module, the second cam or the third cam keeps sending instant images, instant videos and other instant digital data back to the resident AI robot. Then the AI robot keeps comparing the received instant data with the information in the cloud database and searching useful and associated information in the cloud database, with the assistant of cloud computation. As a result, for example the AI robot can instantly recognize and identify a specific person, a specific object, a specific venue, a specific sound pattern, a specific matter, a specific thing, a specific whether pattern and more around the user. By keeping running the resident AI robot on the discrete type wearable computer, a hundreds of thousand possible smart amazing application functions can be actually realized.

Figure 10:
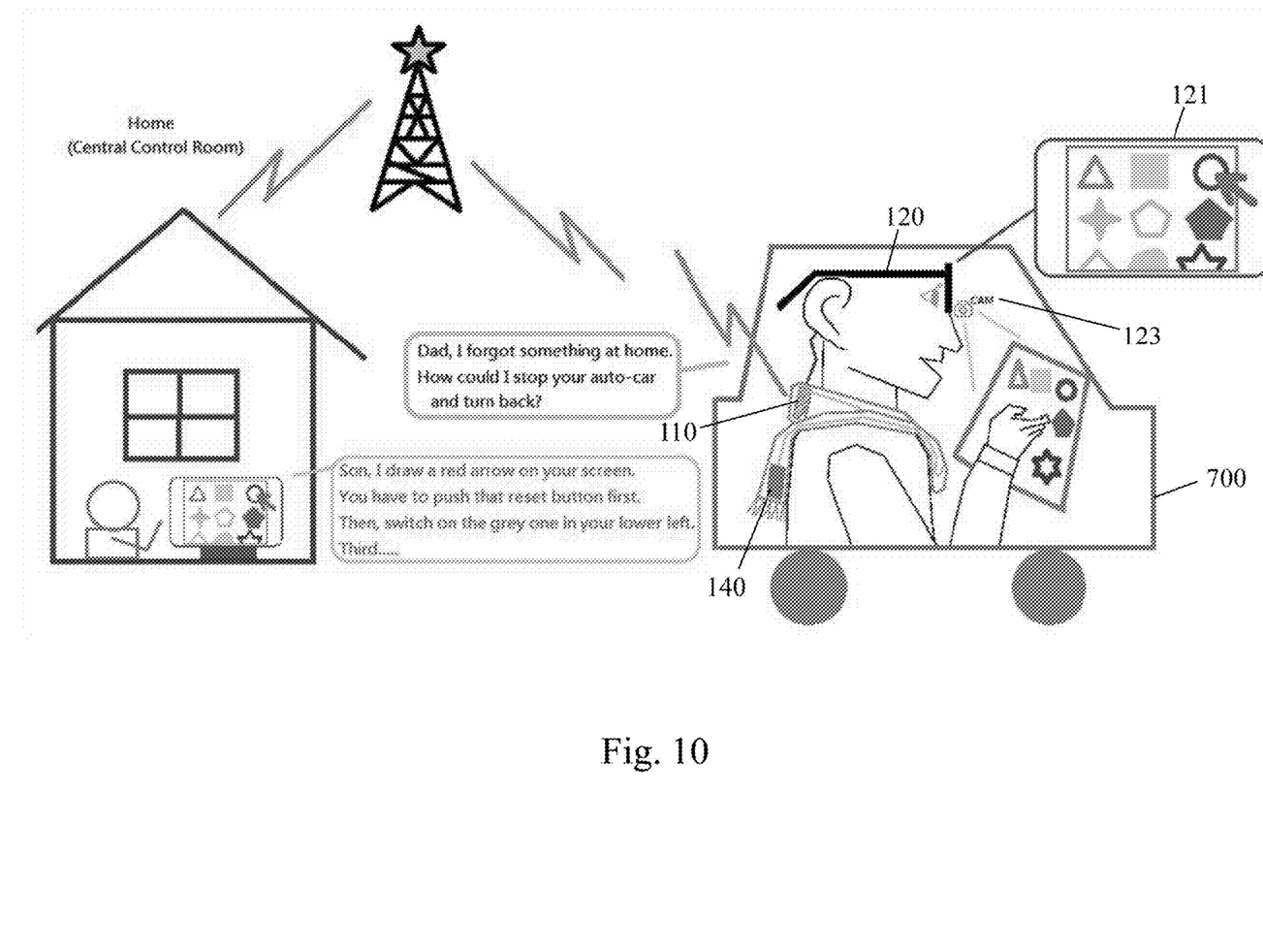
FIG. 10 is a schematic diagram illustrating an operation scenario that a user is using the discrete type wearable computer at the mobile end to communicate with the central control room at the station end and the central control room is partially taking control of the user's computer and sending messages back to the user in accordance with the present invention.

FIG. 10 is a schematic diagram illustrating an operation scenario that a user is using the discrete type wearable computer at the mobile end to communicate with the central control room at the station end and the central control room is partially taking control of the user's computer and sending messages back to the user in accordance with the present invention. Furthermore, there are a remote desktop connection application and an instant video message installed on the main board module 110. Through the remote desktop connection application or the instant video message, a user at a mobile end can establish a wireless connection with a central control room or a backend desk console at a station end. For example, the central control room is fully authorized by the user to access various detailed information occurred, sensed and detected on the user's computer 100 at the mobile end, or to fully or partially take control of the user's computer 100 at the mobile end. A user at the mobile end can interact with the central control room anytime anywhere.

For example, when a user the young male people at mobile end is driving his father's autonomous car 700, suddenly he finds out he does not know how to stop the car and then let it turn back. The user immediately calls his father in the distance in the central control room at the station end by using the wireless communication module on the main board module 110, and activates the remote desktop connection application and the instant video message by the voice control function. The user says: "Dad, I forgot something at home. How could I stop your auto-car and turn back?".

His father in the central control room at the station end receives the calling and messages from the user, activates the remote desktop connection application soon as well and partially takes control of the user's computer. Typically his father can see what is showing on and the user is seeing on the user's near-eye display device 121 synchronously on the screen and therefore this father is able to instruct or guide the user to steer the auto car by the first person view. Then his father immediately draws a red arrow on the user's near-eye display device 121 to first indicate the reset button used to stop the autonomous car through operating the remote desktop connection application, and says: "Son, I draw a red arrow on your screen. You have to push that reset button first. Then, switch on the grey one in your lower left. Third . . . ". The user can allow or does not allow the central control room to take control of the user's computer 100. One central control room at the station end is able to control, survey, and communicate with multiple discrete type wearable computers at the mobile ends.

Furthermore, the present discrete type wearable computer 100 provides many practical application functions as well. For example, there are a HDMI interface and a USB interface on the main board module 110. When a user takes off the discrete type wearable computer 100, connects the HDMI interface with a conventional desktop monitor or a TV display and connects the USB interface with a keyboard, the user can use the discrete type wearable computer 100 like using a conventional personal computer and the computer 100 transforms into a desktop computer. The present discrete type wearable compute 100 has an NFC_eSE function provided by the NFC module on the main board module 110, and is able to use as an access control lock or a proximity sensing lock and an electronic financial instrument of payment.

Moreover, the present discrete type wearable computer 100 covers functions a conventional notebook computer and smart phone used to have, such as, the basic internet connectivity, the email sending, the video conference running, the bar or QR code scanning, and etc., and can runs all popular Apps (application programs) nowadays, such as, Word, Excel, Skype, WeChat, Line, Facebook, instagram, PDF, ERP, other social medias and etc. As compared to a screen on a smart phone, the near-eye display has a relatively large field of view (FOV), and therefore the images and contents which a user actually can see shown on a near-eye display is relatively larger than those shown on a screen on the smart phone. Actually it is able to convey and display much abundant contents and details to the user through the near-eye display. However, the present discrete type wearable computer 100 even has small total volume and light total weight, and is separatable, portable, wearable, which owns functions far better than a conventional smart phone, and sooner or later can probably substitute for a part of the conventional smart phones, the conventional notebook computers, and the conventional personal computers or share a part of current market of the smart phone.

It is to be noticed that the above-mentioned various smart advanced and practical functions, such as, the instant smart translation engine, the instant bilingual translation, the instant OCR function, the time lapse photography, the instant outdoor and indoor smart navigation, the resident AI robot applications, the remote control and more, are realized only by the discrete type wearable computer disclosed and described in the present invention, due to the discrete deployment for modules as described in detailed as above.

As described as above, the present discrete type wearable computer can make many sci-fi scenarios come true and provides lot of amazing but practical application functions. That is because the present invention proposes to separate the modules off, in particular to spin off the battery, and hide them behind a decorative clothing accessory, the scarf, for example. The present invention further utilizes the near-eye display technology and the air mouse technology, and integrates them together to form the present discrete type wearable computer. Of course, any new input and output technologies available in the future are able to put and integrate into the present discrete type wearable computer. For example, the output technologies based on the currently popular AR technology, VR technology or hologram technology, and the input technologies based on the gesture control technology, are able to comparably integrate into the present discrete type wearable computer.

There are further embodiments provided as follows.

Embodiment 1: A discrete type wearable computer includes a clothing accessory having a first installation element, a second installation element and a third installation element; a main board module set on the clothing accessory by the first installation element; a near-eye display module electrically connected with the main board module; an air mouse module electrically connected with the main board module and set on the clothing accessory by the second installation element; and a battery module electrically connected with the main board module and set on the clothing accessory by the third installation element, wherein the main board module, the air mouse module, and the battery module are configured on the clothing accessory and separated from each other.

Embodiment 2: The discrete type wearable computer as described in Embodiment 1, the clothing accessory is one selected from a scarf wear, a scarf, a silk scarf, a neckerchief, a neckpiece, a neckwear, a muffler, a tippet, a neck covering, a shoulder covering, a foulard, a shawl, a scarf based article, a neckpiece based article, and a shawl based article.

Embodiment 3: The discrete type wearable computer as described in Embodiment 1, the first installation element, the second installation element and the third installation element are one selected from a magnet, a clip, an alligator clip, a spring clip, a screw lock, a buckle, a button, belt, a band, a strip, a banding, an elastic strip, a fastener, a quick release element, a hook and loop element, a containing space, a pocket, a pouch, a storage bag, a compartment, and a partition.

Embodiment 4: The discrete type wearable computer as described in Embodiment 1, the main board module includes a CPU (central processing unit), a memory module, a wireless communication module, a GPS module, a USB interface, a HDMI interface, a microphone interface, a second cam module, a second microphone, a NFC interface, a temperature sensor, a uSIM slot, a uSD card slot, an ear phone socket, a signal line socket and a power line socket.

Embodiment 5: The discrete type wearable computer as described in Embodiment 1, the near-eye display module includes a near-eye display, a first cam module, an accelerometer, a gyroscope, an electronic compass, a barometer and a first microphone.

Embodiment 6: The discrete type wearable computer as described in Embodiment 1, the air mouse module includes an air mouse body, a gyroscope, a third microphone, a micro speaker and a USB OTG interface.

Embodiment 7: The discrete type wearable computer as described in Embodiment 1, the battery module includes a first battery and a second battery, the first battery is a fixed rechargeable battery, and the second battery is a replaceable rechargeable battery.

Embodiment 8: The discrete type wearable computer as described in Embodiment 1, the main board module is electrically connected with the near-eye display module, the air mouse module and the battery module through one of a wire based connection, a cable based connection and a wireless connection.

Embodiment 9: The discrete type wearable computer as described in Embodiment 1, further includes the clothing accessory having a first end, a center segment and a second end, wherein the first installation element is configured to locate around the center segment, the second installation element is configured to locate around the first end, and the third installation element is configured to locate around the second end; a first attaching element configured to locate around one of the first end and the second end; a second attaching element configured to locate around one of the first end and the second end; and a third attaching element configured to locate around one of the first end and the second end.

Embodiment 10: The discrete type wearable computer as described in Embodiment 9, the first attaching element, the second attaching element and the third attaching element are one selected from a magnet, a clip, an alligator clip, a spring clip, a button, belt, a band, a strip, a banding, an elastic strip, a fastener, a hook and loop element.

Embodiment 11: The discrete type wearable computer as described in Embodiment 1, the near-eye display module is a transparent type near-eye display device or a see-through type near-eye display device, and the air mouse module is a finger-wearable input device.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A discrete type wearable computer comprising:
a clothing accessory comprising a first installation element, a second installation element and a third installation element;
a main board module set on the clothing accessory by the first installation element;
a near-eye display module electrically connected with the main board module;
an air mouse module electrically connected with the main board module and set on the clothing accessory by the second installation element; and
a battery module electrically connected with the main board module and set on the clothing accessory by the third installation element,
wherein the main board module, the air mouse module, and the battery module are configured on the clothing accessory and separated from each other.

2. The discrete type wearable computer as claimed in claim 1, wherein the clothing accessory is one selected from a scarf wear, a scarf, a silk scarf, a neckerchief, a neckpiece, a neckwear, a muffler, a tippet, a neck covering, a shoulder covering, a foulard, a shawl, a scarf based article, a neckpiece based article, and a shawl based article.

3. The discrete type wearable computer as claimed in claim 1, wherein the first installation element, the second installation element and the third installation element are one selected from a magnet, a clip, an alligator clip, a spring clip, a screw lock, a buckle, a button, belt, a band, a strip, a banding, an elastic strip, a fastener, a quick release element, a hook and loop element, a containing space, a pocket, a pouch, a storage bag, a compartment, and a partition.

4. The discrete type wearable computer as claimed in claim 1, wherein the main board module comprises one selected from a CPU (central processing unit), a memory module, a wireless communication module, a GPS module, a USB interface, a HDMI interface, a microphone interface, a second cam module, a second microphone, a NFC interface, a temperature sensor, a uSIM slot, a uSD card slot, an ear phone socket, a signal line socket and a power line socket.

5. The discrete type wearable computer as claimed in claim 1, wherein the near-eye display module comprises one selected from a near-eye display, a first cam module, an accelerometer, a gyroscope, an electronic compass, a barometer and a first microphone.

6. The discrete type wearable computer as claimed in claim 1, wherein the air mouse module comprises one selected from an air mouse body, a gyroscope, a third microphone, a micro speaker and a USB OTG interface.

7. The discrete type wearable computer as claimed in claim 1, wherein the battery module comprises a first battery and a second battery, the first battery is a fixed rechargeable battery, and the second battery is a replaceable rechargeable battery.

8. The discrete type wearable computer as claimed in claim 1, wherein the main board module is electrically connected with the near-eye display module, the air mouse module and the battery module through one of a wire based connection, a cable based connection and a wireless connection.

9. The discrete type wearable computer as claimed in claim 1, further comprising one of following elements:
the clothing accessory having a first end, a center segment and a second end, wherein the first installation element is configured to locate around the center segment, the second installation element is configured to locate around the first end, and the third installation element is configured to locate around the second end;
a first attaching element configured to locate around one of the first end and the second end;
a second attaching element configured to locate around one of the first end and the second end; and
a third attaching element configured to locate around one of the first end and the second end.

10. The discrete type wearable computer as claimed in claim 9, wherein the first attaching element, the second attaching element and the third attaching element are one selected from a magnet, a clip, an alligator clip, a spring clip, a button, belt, a band, a strip, a banding, an elastic strip, a fastener, a hook and loop element.

11. The discrete type wearable computer as claimed in claim 1, wherein the near-eye display module is a transparent type near-eye display device or a see-through type near-eye display device, and the air mouse module is a finger-wearable input device.

* * * * *